Jan. 7, 1936.  A. LEBERT  2,026,688
BALANCING MACHINE
Filed March 25, 1933
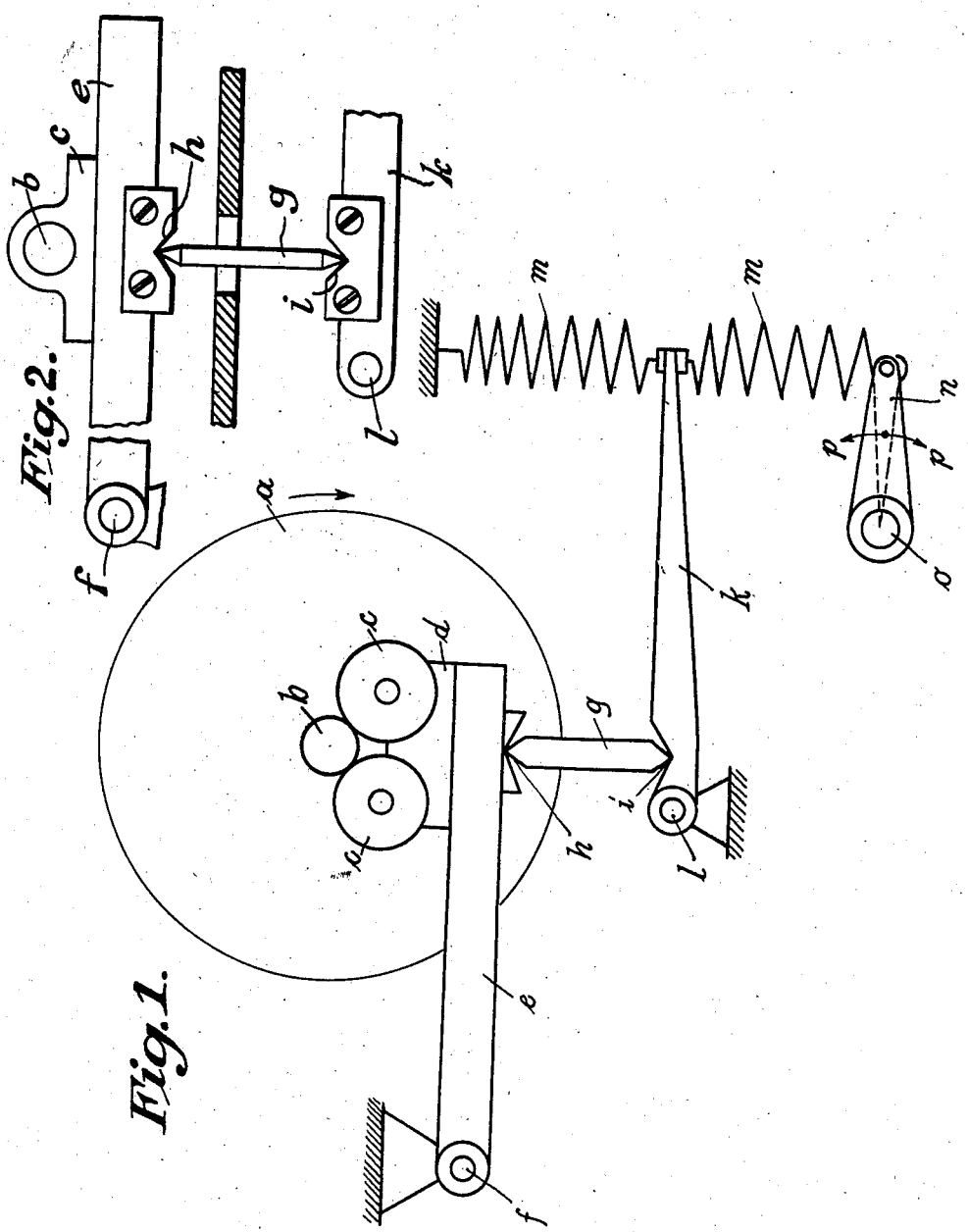
INVENTOR
ALFRED LEBERT
BY Lester L. Sargent
ATTORNEY Patented Jan. 7, 1936

2,026,688

UNITED STATES PATENT OFFICE 2,026,688

BALANCING MACHINE

Alfred Lebert, Dusseldorf-Morsenbroich, Germany

Application March 25, 1933, Serial No. 662,781
In Germany November 10, 1930

2 Claims. (Cl. 73—51)

This invention relates to balancing machines for determining the dynamic unbalance of a rotary body, and more particularly to means for simplifying machines of this class and increasing their sensibility and accuracy of measurement.

In such machines, the rotary body to be balanced is supported by spring-cushioned bearings which vibrate during the rotation of the body to be balanced under the influence of unbalanced weight. It has been proposed to measure the magnitude of unbalanced force by compensating these vibrations by means of counter-forces which are adjustable as to phase and magnitude and which are transmitted to the body to be balanced by means of a spring.

According to the invention, such machines can be essentially simplified by transmitting the counter-forces not to a separate spring, but directly to the cushioning which is provided already for the elastic arrangement of the body to be balanced. For example, the machine can be constructed so as to have only one spring acting with one end on the body to be balanced or the bearing thereof or the frame containing the bearings, and secured with the other end to an abutment which is movable for transmitting counter-forces in accordance with the oscillations of the body to be balanced.

A machine simplified in the manner indicated permits extraordinary accuracy in ascertaining unbalance, since, owing to the lack of additional cushioning, there are no resonance or interfering vibrations in the system, which could impair the efficiency and accuracy of measuring.

If the bodies to be balanced are relatively heavy, it might happen that in machines of the type described heavy and strong springs are required for supporting the bearings, which naturally would impair accuracy of measurement, and the invention aims therefore at providing means permitting the use of very light and sensitive springs even if the masses to be balanced are of great weight. This aim is attained by interposing between the bearing means of the body to be balanced and the cushioning a leverage comprising a plurality of levers so as to provide a separate lever each for bearing and cushioning and to cause the first lever to be supported by the other. This construction makes it possible, regardless of the dimensions and size of the bearing and without waste of space, to employ any desired leverage in order to use very light and highly delicate springs whereby the power input for producing counter-oscillations is reduced also.

By way of example, one form of the invention is illustrated in the accompanying drawing, in which Fig. 1 is an end elevation in which only those parts of a balancing machine are shown which form the vibratory system, the part shown being duplicated on the opposite side of the body to be balanced.

Fig. 2 is a detail view of the displaceable bearings on levers $e$ and $k$ in a modification of the invention.

Referring to the drawing, the body to be balanced is designated $a$ and is rotatably disposed with its axis $b$ on the rolls $c$ attached to a bracket $d$ secured to one end of a horizontally disposed lever $e$ which is pivoted on its other end to a fixed abutment at $f$.

Below the bracket $d$, the horizontally disposed lever $e$ is carried by a vertical support $g$ having its ends engaging the respective bearings $h$, $i$, the lower end of support $g$ resting on the bearing $i$, a lever $k$ pivoted at $l$ to a fixed abutment, whereas the other end of the lever $k$ engages a spring $m$ on which the entire system is elastically supported.

The upper end of the spring $m$ is secured at a stationary point and the lower end thereof is secured to a lever $n$ which swings about a shaft $o$. By means of a device not shown, the lever $n$ can be driven so as to carry out accurately regulatable strokes in the direction of the arrows $p$.

The device functions as follows:

The body $a$ to be balanced is rotated about its axis $b$ by means of a drive, not shown. The unbalance will then produce forces acting on the lever $e$, and these forces will be transmitted by the support $g$ to the lever $k$ which, according to the distance between the bearing $i$ and the fulcrum $l$ on the one hand and the bearing $i$ and the spring $m$ on the other, will effect such a leverage that the effect of forces due to unbalance on the spring $m$ will be quite small. Therefore, a weak spring of high sensibility may be used for cushioning.

The lower edge $i$ of the support $g$ may be positioned near the fulcrum $l$ of the lever $k$ as closely as desired so as to make any ratio possible. It is further possible to render the bearings for the supports $g$ displaceable on the levers $e$ and $k$.

The bearings $h$ and $i$ are adjustably mounted on the respective levers $e$ and $k$ and are retained in adjusted position by suitable means such as the screws or bolts shown in Fig. 2. The bearings are notched to receive the ends of support $g$.

I claim:—

1. A balancing machine for determining the dynamic unbalances of a rotary body, comprising bearing means supporting said body, cushioning means for elastically supporting said bearing means, a leverage interposed between said bearing means and said cushioning means, said leverage composed of a horizontally disposed free swinging lever constituting the sole support for the bearing means and a second horizontally disposed free swinging lever attached to the cushioning means and supporting said first lever, and a third lever movable and arranged for transmitting pulsatory regulatable counterforces in accordance with the period of the oscillations of said rotary body, said lever working directly against the cushioning means of said bearing means.

2. A balancing machine according to claim 1, the leverage comprising a strut interposed between said both free swinging levers, knife edges on the opposite ends of said strut, bearings on said both free swinging levers for receiving said knife edges, said bearings being displaceably arranged along said swinging levers.

ALFRED LEBERT.